US012086300B2

(12) United States Patent
Delaney et al.

(10) Patent No.: US 12,086,300 B2
(45) Date of Patent: Sep. 10, 2024

(54) ADJUSTMENT OF DISPLAY ORIENTATION BASED ON CONTEXT AND LOCATION OF USER IN MULTI-USER ENVIRONMENT

(71) Applicant: Lenovo (Singapore) Pte. Ltd., Singapore (SG)

(72) Inventors: Mark Delaney, Raleigh, NC (US); Nathan Peterson, Oxford, NC (US); Russell Speight VanBlon, Raleigh, NC (US); John C Mese, Cary, NC (US); Arnold Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/818,680

(22) Filed: Aug. 9, 2022

(65) Prior Publication Data
US 2024/0053815 A1 Feb. 15, 2024

(51) Int. Cl.
| G06F 3/01 | (2006.01) |
| G06F 3/147 | (2006.01) |
| H04N 13/366 | (2018.01) |
| H04N 13/30 | (2018.01) |
| H04N 13/368 | (2018.01) |

(52) U.S. Cl.
CPC .............. *G06F 3/011* (2013.01); *G06F 3/147* (2013.01); *H04N 13/366* (2018.05); *H04N 13/368* (2018.05); *H04N 2013/40* (2018.05)

(58) Field of Classification Search
CPC .................................. G06F 3/011; G06F 3/147
See application file for complete search history.

(56) References Cited

U.S. PATENT DOCUMENTS

| 2002/0149613 A1* | 10/2002 | Gutta | H04N 5/74 715/728 |
| 2017/0187722 A1* | 6/2017 | Roundtree | H04W 12/64 |
| 2019/0369593 A1* | 12/2019 | Murakami | G06V 10/24 |
| 2021/0397214 A1* | 12/2021 | Yamamoto | F16M 11/126 |

OTHER PUBLICATIONS

"Amazon Astro", Wikipedia, retrieved from https://en.wikipedia.org/wiki/Amazon_Astro on Jul. 29, 2022.
"Amazon Echo Show", Wikipedia, retrieved on Jul. 29, 2022 from https://en.wikipedia.org/wiki/Amazon_Echo_Show.
"Ergotron—mounting kit—Patented Constant Force Technology—for LCD disp", CDW, retneved from https://www.cdw.com/product/ergotron-mounting-kit-patented-constant-force-technology-for-lcd-disp/3124614?cm_ven=acquirgy&cm_cat=google&cm_pla=NA-NA-Ergotron_MH&cm_ite=3124614&ef_id=Cj0KCQjw5-WRBhCKARIsAAld9FmmGItUpWWidzWKE8PzFjC0G0-qGZ3nNbpZLGEOjsryiqYXOVS6cmlaAiiJEALw_wcB:G:s&s_kwcid=AL!4223!3!198550814832!!!g!336522213510!&gclid=Cj0KCQjw5- .
"Samsung's New Vertical 4K TV Rotates | CES 2020", YouTube, Jan. 7, 2020. Retrieved from https://www.youtube.com/watch?v=eDoaYIJwm1s on Jul. 29, 2022.
Anderson, RJ, "Amazon's Echo Show 10 is a fantastic starter smart home device", Mashable, Oct. 10, 2022.
Priest, David, "Amazon Astro Review: It's Cute, Getting More Automated and Not Worth It Yet", CNET, Sep. 28, 2022.

* cited by examiner

*Primary Examiner* — Adam R. Giesy
(74) *Attorney, Agent, or Firm* — John M. Rogitz; John L. Rogitz (57) ABSTRACT

In one aspect, a device includes at least one processor, a display accessible to the at least one processor, and storage accessible to the at least one processor. The storage includes instructions executable by the at least one processor to identify a context associated with a user, identify a location of the user, and adjust the orientation of the display to direct (Continued)

Physical Orientation Rotates Relative To User Location the display toward the location of the user based on the context associated with the user and the location of the user.

20 Claims, 5 Drawing Sheets

ADJUSTMENT OF DISPLAY ORIENTATION BASED ON CONTEXT AND LOCATION OF USER IN MULTI-USER ENVIRONMENT

FIELD

The disclosure below relates to technically inventive, non-routine solutions that are necessarily rooted in computer technology and that produce concrete technical improvements. In particular, the disclosure below relates to adjustment of display orientation based on a context and location of a user in a multi-user environment.

BACKGROUND

As recognized herein, displays on smart devices such as stand-alone digital assistant devices are typically stationary and present content observable by multiple users in the same area even if the content is not relevant to all users. As also recognized herein, a user for which the content is relevant may not be as optimally positioned to view the content as other users for which the content is not relevant. Currently these smart devices lack the functionality to adequately compensate for these factors.

SUMMARY

Accordingly, in one aspect a first device includes at least one processor, a display accessible to the at least one processor, and storage accessible to the at least one processor. The storage includes instructions executable by the at least one processor to identify a context associated with a user, identify a location of the user, and adjust the orientation of the display to direct the display toward the location of the user based on the context associated with the user and the location of the user.

Accordingly, in one example implementation the user may be a first user and the instructions may be executable to identify a second user different from the first user, determine that the second user is not associated with the context, and select the first user to direct the display toward the location of the first user based on the second user not being associated with the context and based on the display currently presenting content associated with the context.

Also in an example implementation, the user may be a first user, the context may be a first context, and the instructions may be executable to identify a second user different from the first user, identify a second context associated with the second user, and select the first user to direct the display toward the location of the first user based on the display currently presenting content associated with the first context but not the second context.

Still further, if desired in some examples the instructions may be executable to adjust the orientation of the display to direct the display toward the location of the user by adjusting the orientation of the display radially along a horizontal plane. E.g., the instructions may be executable to adjust the orientation of the display to direct the display toward the location of the user so that a content-bearing face of the display faces the user along the horizontal plane even if the content-bearing face of the display is oriented obliquely relative to the horizontal plane.

Additionally, in some example embodiments the first device may include a motor that is actuatable to adjust the orientation of the display.

Still further, in some example implementations the instructions may be executable to access at least one profile associated with the user to identify the context. The at least one profile may include a social media profile, a video streaming service profile, and/or a browser history of the user.

Also in various example implementations, the instructions may be executable to receive at least one wireless signal from a second device different from the first device and, based on the at least one wireless signal and communication with a third device different from the first and second devices, triangulate the location of the second device and use the location of the second device as the location of the user. Additionally or alternatively, the instructions may be executable to receive input from a microphone and/or a camera to then identify the location of the user based on the input.

In another aspect, a method includes identifying a context associated with a user and identifying a location of the user. Based on the context associated with the user and the location of the user, the method then includes actuating a motor in a first device to adjust the orientation of a display to direct the display toward the location of the user.

Thus, in one example implementation the user may be a first user and the method may include identifying a second user different from the first user, determining that the second user is not associated with the context, and selecting the first user to direct the display toward the location of the first user based on the second user not being associated with the context and based on the display currently presenting content associated with the context.

Also in an example implementation, the user may be a first user, the context may be a first context, and the method may include identifying a second user different from the first user, identifying a second context associated with the second user, and selecting the first user to direct the display toward the location of the first user based on the display currently presenting content associated with the first context but not the second context.

Additionally, in some examples the method may include adjusting the orientation of the display to direct the display toward the location of the user by adjusting the orientation of the display radially along a horizontal plane.

Also if desired, in certain example the method may include accessing digital profile data associated with the user to identify the context. The digital profile data may include social media likes of other people's content.

In still another aspect, at least one computer readable storage medium (CRSM) that is not a transitory signal includes instructions executable by at least one processor to identify a context associated with a user, identify a current location of the user, and adjust the orientation of a display to direct the display toward the current location of the user based on the context associated with the user and the current location of the user.

Thus, in one example implementation the context may be a first context and the instructions may be executable to track respective current locations of the first user and a second user as both the first and second users move about an environment, where the second user may be different from the first user. Here the instructions may then be executable to adjust the orientation of the display to direct the display toward the current location of the second user based on the second user being associated with a second context and responsive to content presented on the display changing from content associated with the first context to content associated with the second context. The second context may be different from the first context.

The details of present principles, both as to their structure and operation, can best be understood in reference to the accompanying drawings, in which like reference numerals refer to like parts, and in which:

DETAILED DESCRIPTION

Among other things, the detailed description below discusses electronically adjusting the physical orientation of a hardware display in a multi-user environment or even single-user environment. This can help reduce eye strain, glare, and perceived quality of content that is being presented while also using the device's energy and processor resources in an optimal way for maximized user benefit.

Thus, in one aspect a display's physical orientation may be dynamically adjusted within a multi-user environment at the hardware level and/or operating system/application level. IoT connectivity and digital fingerprints may be used to triangulate user location and lookup profile data to do so. User and location detection using sensors such as cameras and microphones may also be used to do so. User profiling from the linkage of accounts or manual inputs of a particular user's likes and dislikes may also be used.

As an example, suppose a first user is in a living room with his family of five. A smart device with display begins presenting an F1 race on its display. The smart device may know through user profiling that the first user is a fan of F1, race cars more generally, or even sports more generally, and accordingly F1 and the first user's interest profile may be highly correlated or at least correlated to some degree. Meanwhile, the other four members of the family may have low correlated interest in F1 racing. Accordingly, the device may physically rotate its display to continue to target the first user as the first user moves around the room so that the first user can best watch and see the F1 race even if the other disinterested users cannot see the race very well.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
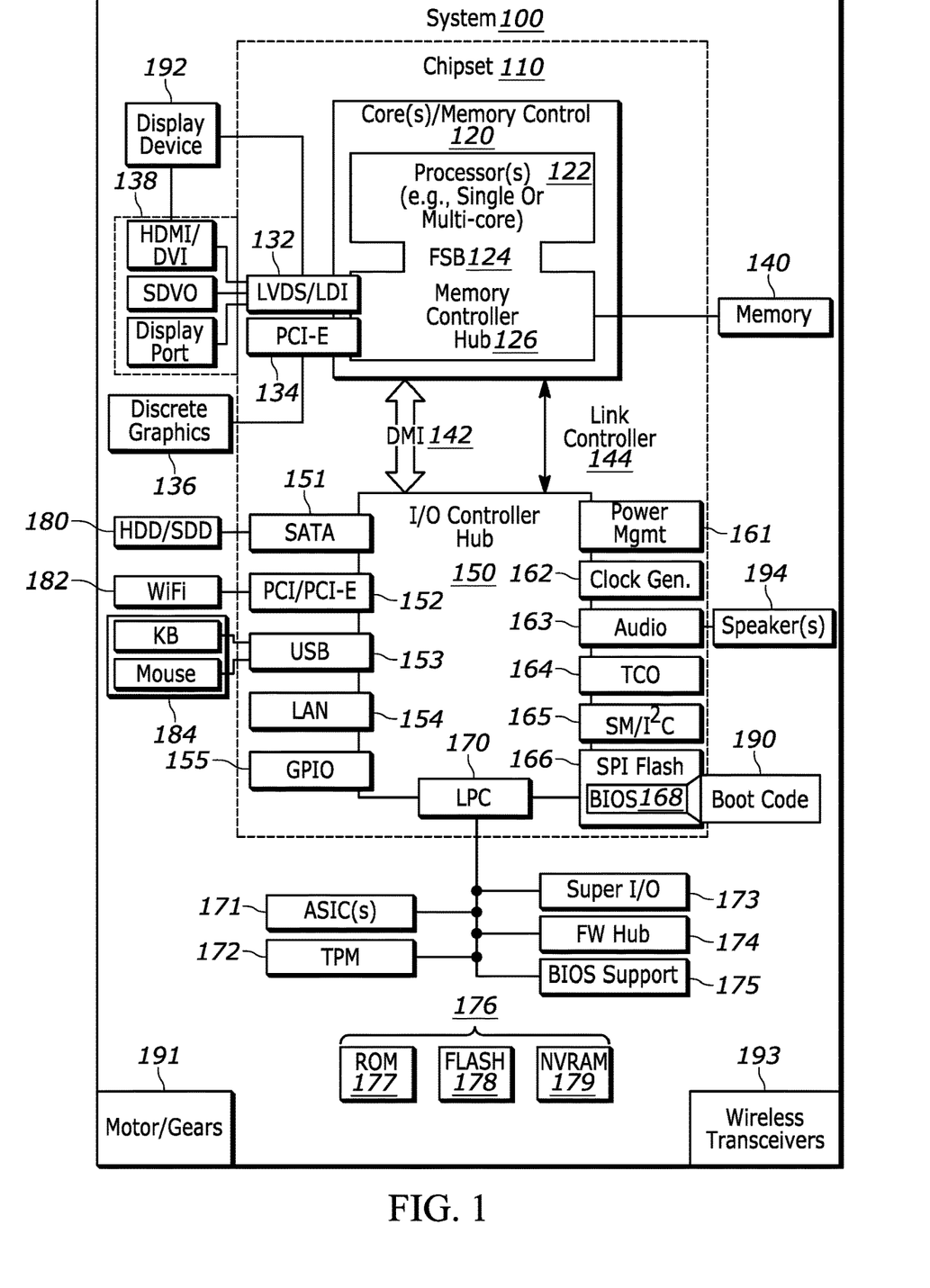
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a motor and gears 191 to rotate the display device 192 as will be described further below. The motor may be an electric motor, for example, that is actuatable to move the gears to rotate the display device 192 at least along a horizontal plane.

Still further, the system 100 may include one or more additional wireless signal transceivers 193, such as a Wi-Fi transceiver configured for Wi-Fi communication using Wi-Fi communication protocols, a Bluetooth transceiver configured for Bluetooth communication using Bluetooth communication protocols, and/or an ultrawideband (UWB) transceiver configured for UWB communication using UWB communication protocols (e.g., such as protocols set forth by the FiRa Consortium).

Consistent with present principles, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples. To transmit UWB signals consistent with present principles, the transceiver 193 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for the system 100 to determine the distance to and location of another UWB transceiver on another device that is in communication with the UWB transceiver 193 on the system 100.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122.

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
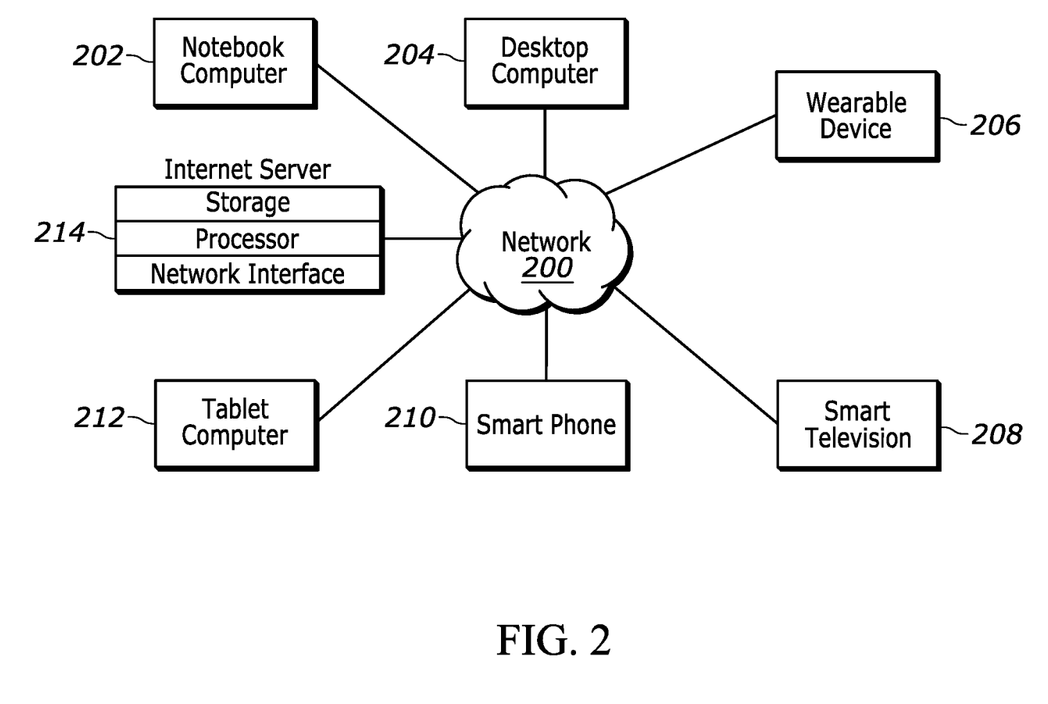
FIG. 2 is a block diagram of an example network of devices consistent with present principles.

Turning now to FIG. 2, example devices are shown communicating over a network 200 such as a Wi-Fi network, a Bluetooth network, a UWB network, and/or the Internet consistent with present principles (e.g., to exchange wireless signals and perform triangulation to track users and present content as described herein). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
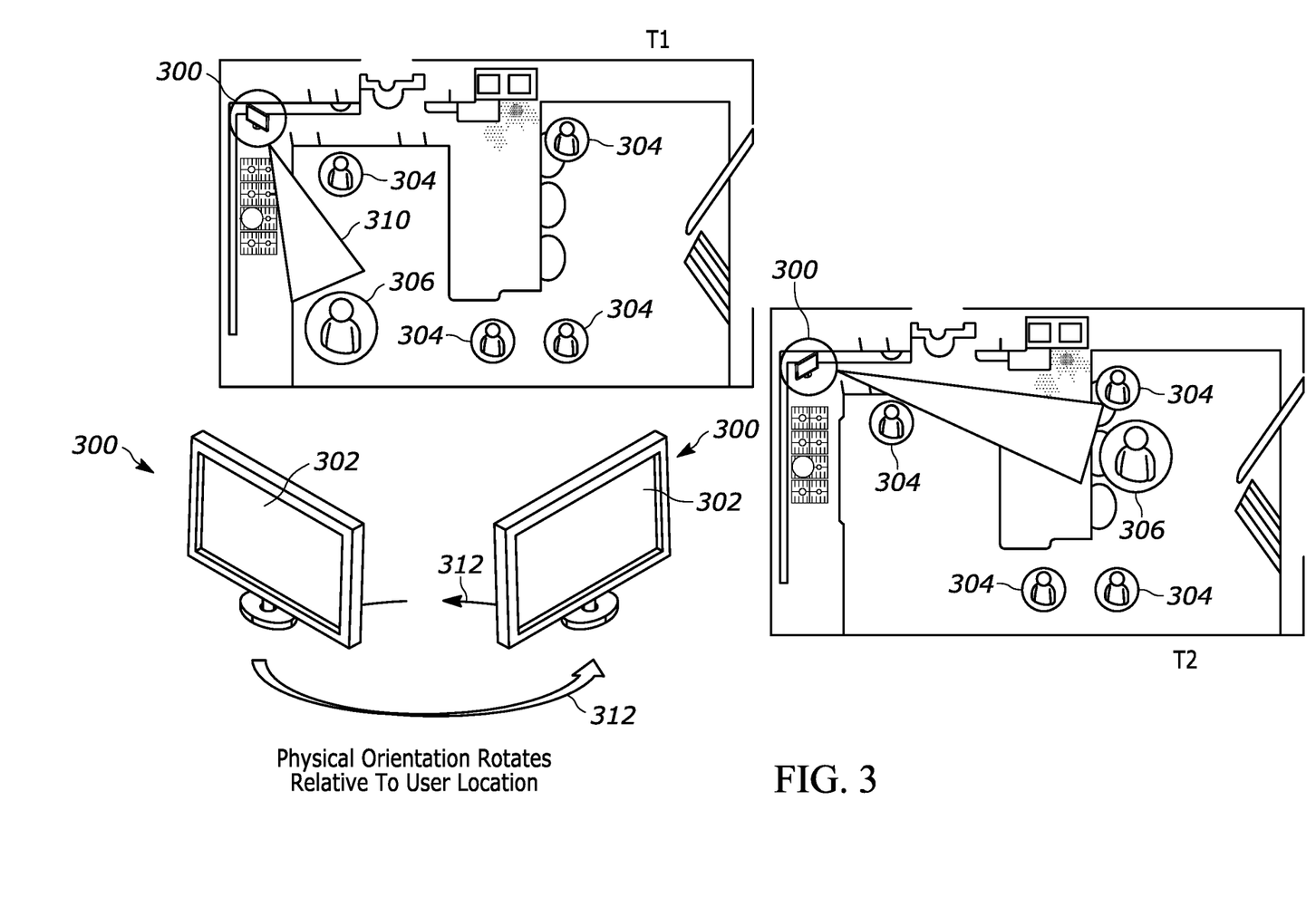
FIG. 3 is a schematic diagram of multiple users and a smart device within an environment consistent with present principles.

Now in reference to FIG. 3, an example schematic diagram is shown of a living room of a personal residence at different times T1 and T2 as indicated by the "T1" and "T2" boxes shown. FIG. 3 also shows a smart device 300. The device 300 may include a touch-enabled liquid crystal display 302 or other type of display, and may be established by a stand-alone digital assistant device such as a Lenovo Thinksmart Hub, an Internet of Things (IoT) device, or even smartphone, laptop, or other device docked with a docking station with rotation capability as described herein.

As also shown in FIG. 3, multiple non-targeted users 304 and a targeted user 306 are currently present within the living room and are being tracked by the device 300. The user 306 may be identified as a target based on the device 300 correlating content that is currently presented on the display 302 with data in one or more digital profiles of the user 306. For example, the content being presented on the display 302 may be tagged with metadata indicating various topics/contexts associated with the content, and one or more of those contexts may be identified as matching or otherwise being correlated to one or more contexts of the user 306 that are themselves related to the user's own likes, tastes, preferences, etc. In contrast, the non-targeted users 304 may not be associated with one or more topics/contexts of the content itself as identified by the device 300 from their own respective profile data.

Therefore, based on the content's context matching or otherwise being related to a context of the user 306, the device 300 may rotate its display 302 so that the display's front face continues to follow the user's real-time bearing relative to the display 302 as the user 306 moves about the living room environment. Thus, illustrative optimal line of sight 310 indicates that at time T1 the display 302 is rotated in a first direction to face the user 306 according to the current bearing to the user 306 (e.g., while the base of the device 300 remains stationary). Additionally, at time T2 later than time T1, the user may be located at a second location as shown and so the optimal line of sight 310 for time T2 indicates that the display 302 has now been rotated in a second, different direction to continue facing the user 306 according to the new current bearing to the user 306.

Note here that the orientation of the display 302 may be adjusted to direct the display toward the location of the user by adjusting the orientation of the display radially along a horizontal plane, as demonstrated by arrows 312. Thus, even if the plane of the content-bearing face of the display 302 is oriented obliquely relative to the horizontal plane as shown in FIG. 3, the orientation of the display 302 may still be adjusted to direct the display toward the location of the user so that the content-bearing face of the display faces the user along the horizontal plane. However, further note that in some examples the display may also be adjusted in other dimensions as well if desired (e.g., the device 300 may adjust the display's Y-Z tilt angle between obtuse, perpendicular, and acute relative to the horizontal plane to direct the display 302 toward the head of the user 306 as the user's head height changes relative to the display 302). And further note here that the orientation adjustments may be made by actuating a motor and gear assembly on the device 300 that is configured to rotate the display 302 in all three dimensions (e.g., relative to a stationary base of the device that is coupled to the display 302).

Figure 4:
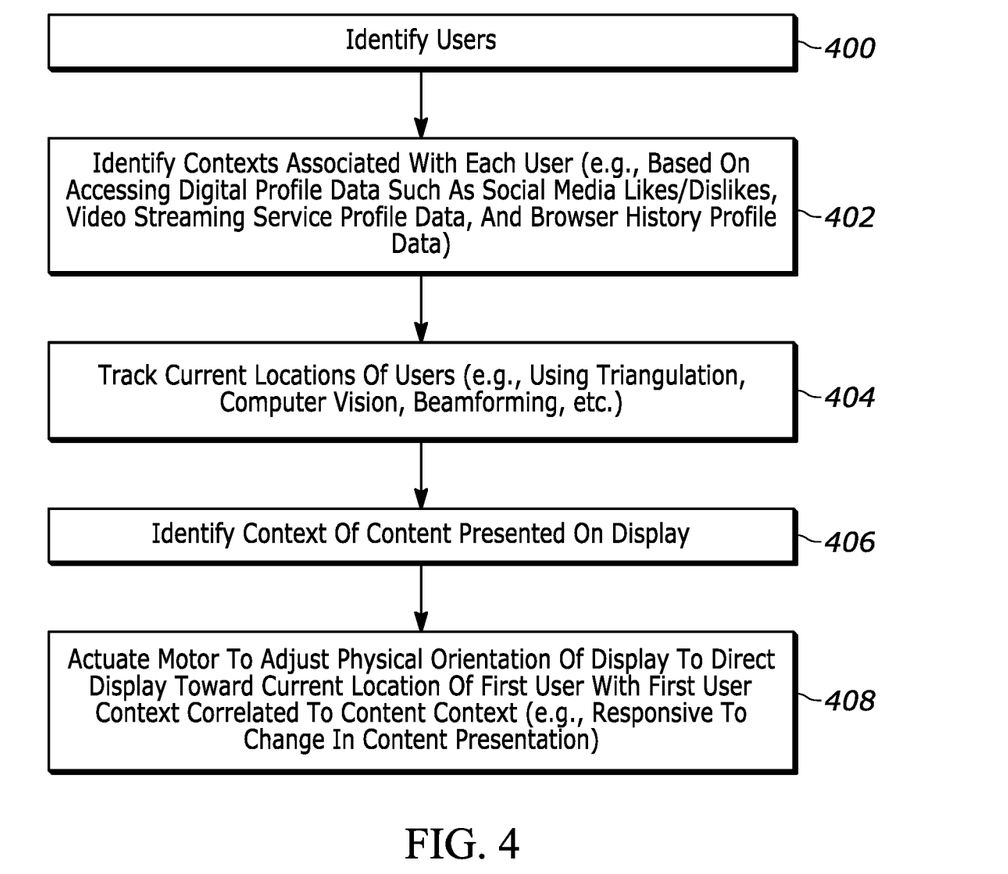
FIG. 4 illustrates example logic in example flow chart format that may be executed by a device consistent with present principles.

Continuing the detailed description in reference to FIG. 4, example logic consistent with present principles is shown that may be executed by a device such as the system 100, device 300, and/or a remotely-located server in any appropriate combination. Note that while the logic of FIG. 4 is shown in flow chart format, other suitable logic may also be used.

Beginning at block 400, the device may identify one or more users within a particular area. The area may be a particular room of a building with bounds (e.g., walls) identifiable via computer vision or an area defined by a threshold distance from the smart device itself (e.g., a sphere of a threshold radius of ten feet around the device). Thus, in some examples the device may receive input from a camera on or in communication with the device to not only identify the area but to also execute facial recognition using the camera input to identify the users within the area. Additionally or alternatively, the device may receive input from a microphone on or in communication with the device to execute voice recognition using the mike input to identify the users within the area.

As another example, wireless Bluetooth, Wi-Fi, or UWB signals may be received from another device associated with a particular user in the area (e.g., that user's smartphone), where the signals may indicate a user ID, the user's name, a MAC address associated with the user, or other identifying information. The strength of the signals may then be evaluated to determine whether they originate from within the area itself (e.g., using a received signal strength indication (RSSI) algorithm) to thus identify that user as a potential target user.

Other techniques for user identification may also be used at block 400.

From block 400 the logic may then proceed to block 402. At block 402 the device may identify one or more contexts associated with each of the identified users. For example, once the users are identified, publicly-accessible data for each user or data for each user to which the device 300 has already been granted access may be accessed to identify one or more interests, likes, dislikes, content viewing preferences, etc. of each user (with those interests, likes, etc. establishing different contexts associated with the user). E.g., a user's social media profile may have a "likes" or "interests" section where the user has already input one or more likes or interests. The social media profile may even indicate certain themed pages that the user has "liked" or "followed", as well as certain celebrity and professional pages of various people that the user has "liked" or "followed", where those pages have already been associated/tagged with various contexts. Additionally or alternatively, the device itself may parse those social media pages using natural language understanding to tag them itself with various contexts.

For example, the profile page for a particular F1 driver may have been liked by a certain user, establishing that F1 driver's name and/or F1 racing more generally as a context associated with that user.

As another example, a user's online video sharing platform profile may be accessed to identify various tube channels to which the user has subscribed and that are already tagged with metadata of context/topics to which the channels relate (e.g., an F1 racing channel for the context of F1, a baseball highlights channel for the context of baseball, cooking demonstrations for the context of cooking, etc.). Metadata indicating various contexts associated with videos the user has watched through a video streaming service such as Netflix while logged into the user's streaming service profile may also be used to identify a context associated with the user from the profile.

Still further, device application (app) usage history and/or Internet browser history may also be used to identify one or more contexts of a given user. For example, device apps stored at the user's smartphone may already be tagged with metadata that the device can access and that indicates various context tags associated with the app itself (e.g., the XYZ news app may be tagged with a "national news" tag and the user may therefore be identified as having an interest in national news). As another example, the user's Internet browser history from the user's smartphone or laptop computer may be accessed to identify various websites the user has visited and lookup metadata tags for various contexts associated with the visited websites themselves (e.g., a nature enthusiasts' website may be tagged with a "nature" tag and a "wildlife" tag in the site's HTML header).

The foregoing are examples and it is to therefore be understood that the contexts of the identified users may be identified using other types and sources of data as well.

From block 402 the logic may then proceed to block 404. At block 404 the device may track the current locations of the identified users over time. For example, the device executing the logic of FIG. 4 may receive at least one wireless signal from another device associated with an identified user (e.g., based on MAC address or user ID being reported via the wireless signals). The wireless signals might be Bluetooth or Wi-Fi signals, for example. The device may then use an RSSI algorithm to identify the strength of the wireless signals as received by the device of FIG. 4 and the reported strength of the same signals as received at yet another (third) device such as an IoT device within the same area that also executed an RSSI algorithm using the signals. The device of FIG. 4 may then use the signal strengths and the known locations of the two receiving devices to triangulate the location of the user's device that emitted the signals. The locations of the receiving devices might be known based on GPS coordinates reported by GPS transceivers on the receiving devices. The receiving devices might also identify their locations based on execution of computer vision using images from their respective cameras to identify their relative positioning with respect to each other in the area.

Images from a camera accessible to the device of FIG. 4 might also be used to identify and track the users' locations using computer vision and other image processing techniques (e.g., once a respective user's face has been identified through facial recognition). Additionally or alternatively, input from a microphone may be used to identify the user's location using beamforming (e.g., once the user's voice has been identified through voice recognition). Other techniques may also be used for tracking the current locations of the various users identified at block 400, such as UWB location tracking using UWB signals received from the relevant user's device.

From block 404 the logic may then proceed to block 406. At block 406 the device may identify one or more contexts associated with content that is currently being presented on the device's display. The device may do so using one of the techniques described herein, including accessing metadata tags in an HTML header for a website at which the content is accessed, accessing metadata tags attached to the content itself, executing natural language understanding and topic segmentation to identify contexts from text and audio of the content, etc.

Thus, in one example at block 406 the device may determine that a first user is associated with a first context but that a second user is not associated with the first context to then select the first user to direct the display toward the current location of the first user based on the second user not being associated with the first context and based on the display currently presenting content also associated with the first context. As another example, at block 406 the device may determine that the first user is associated with the first context and that the second user is associated with a second context different from the first context to then select the first user to direct the display toward the current location of the first user based on the display currently presenting content also associated with the first context but not associated with the second context.

From block 406 the logic may then move to block 408. At block 408 the device may actuate its motor to adjust the physical orientation of its display to direct the display toward the current location of a target user that has a user context correlated to the context of the content itself. Moreover, if the content being presented on the display changes from first content having a first context to second content having a second context, and the first context is associated with one user and the second context is associated with another user, then responsive to the content changing to the second content the device may adjust the physical orientation of the display from being directed toward the current location of the first user to being directed toward the current location of the second user. This might happen if television content is being presented on the display and someone changes the channel being presented to thus present different television content, for example. Or this might happen if multiple Internet videos are being autonomously streamed in sequence or from a playlist and one video begins playing after another video ends.

Figure 5:
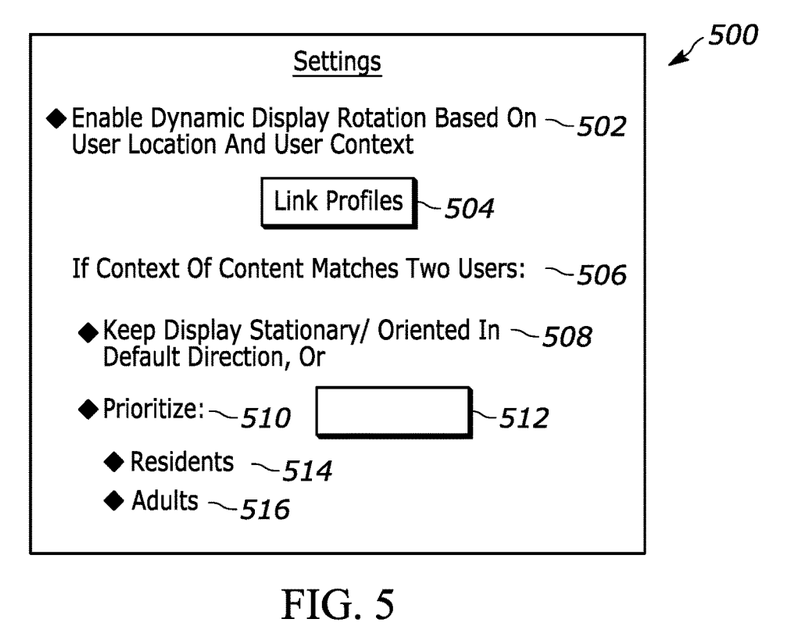
FIG. 5 shows an example settings graphical user interface (GUI) that may be presented on a display to configure one or more settings of a smart device to operate consistent with present principles.

Now in reference to FIG. 5, an example graphical user interface (GUI) 500 is shown that may be presented on the display of the device undertaking the logic of FIG. 4 to configure/enable one or more settings of the device for operation consistent with present principles. The settings GUI 500 may be reached by navigating a settings menu of the device itself or a dedicated app menu for display movement, for example. Also note that in the example shown, each option or sub-option discussed below may be selected by directing touch or cursor or other input to the respective check box adjacent to the respective option.

As shown in FIG. 5, the GUI 500 may include an option 502 that may be selectable a single time to set or enable the device/system to undertake present principles in multiple future instances to dynamically rotate a display based on the location of various users and various contexts associated with the users. For example, selection of the option 502 may configure the device to execute the logic of FIG. 4 as well as to execute the other actions described in reference to other figures described herein (e.g., FIGS. 3 and 6).

The GUI 500 may also include a selector 504. The selector 504 may be selectable to link or indicate one or more profiles of a particular user with the device so that the device can use the profiles to identify one or more contexts of the user themselves. The profiles might be one of the ones discussed above and, as such, the user might provide login details for accessing the profile via whatever platform is hosting it or may even provide a publicly-accessible uniform resource locator (URL) at which the profile may be accessed.

FIG. 5 also shows that the GUI 500 may include a setting 506 related how to handle a conflict where multiple users are located at different locations within a given area and both users have a context associated with the presented content itself. The setting may therefore have a first option 508 and a second option 510. Option 508 may be selectable to set or enable the device to keep the display stationary at whatever current orientation it is in when the conflict is identified, and/or may be selectable to maintain the display in a stationary default direction/orientation. In contrast, option 510 may be selectable to prioritize one user over the other user(s) for which the conflict exists.

Thus, under option 510 may be a text entry box 512 at which users that take top priority may be specified so that the display faces that top priority user(s) when a conflict exists. Additionally or alternatively, sub-options 514 and 516 may be selected as well. Sub-option 514 may be selected to prioritize residents of a given personal residence in which the device is disposed over non-residents. Option 516 may be selected to prioritize adults over children.

Figure 6:
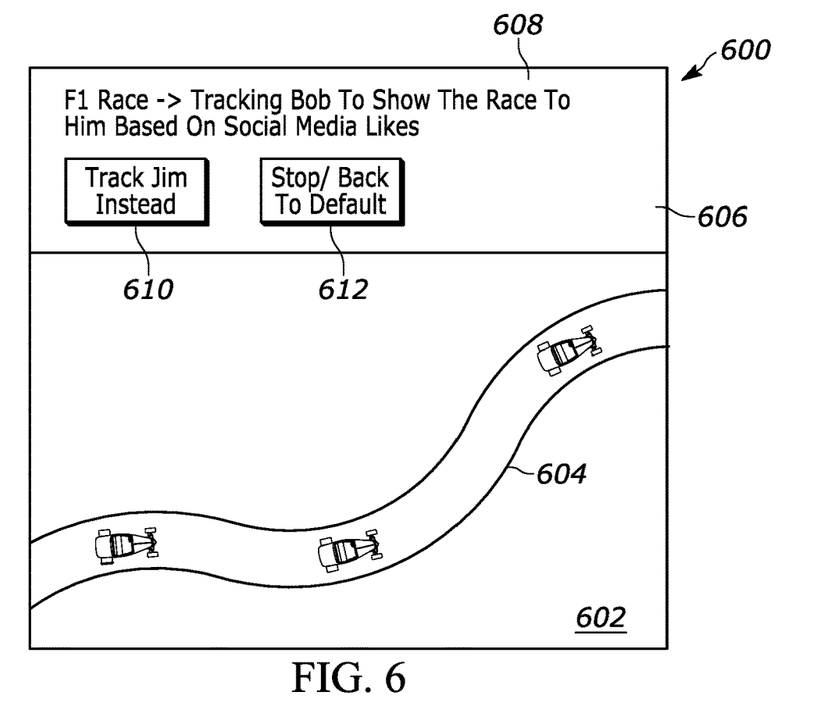
FIG. 6 shows a GUI that may be presented on a display to present content correlated to a particular user in a multi-user environment consistent with present principles.

Now in reference to FIG. 6, an example GUI 600 is shown that may be presented on a rotatable display controlled by a device operating consistent with present principles. As shown, the GUI 600 includes video content 602 which in this example is a livefeed of a Formula One (F1) race car race along a racetrack 604.

As also shown in FIG. 6, the GUI 600 may include a graphical overlay 606. The overlay 606 may include a prompt or indication 608 that an F1 race is currently being shown and that the orientation of the device's display is directed toward a user named Bob to show the F1 race to him based on Bob's social media likes of profiles and individual posts that are associated with F1 racing. The overlay 606 may also include a selector 610 that may be selectable to command the device to track another identified user named Jim as the target user and instead direct the display towards Jim's current location. A selector 612 may also be presented as part of the overlay 606 and may be selectable to command the device to stop orienting the display toward any given user based on real-time location tracking and to instead maintain the display in a stationary or default orientation.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a display accessible to the at least one processor; and
   storage accessible to the at least one processor and comprising instructions executable by the at least one processor to:
   access at least one profile to identify a first context associated with a first user;
   correlate the first context associated with the first user to a second context associated with content presented on the display;
   identify a location of the first user; and
   based on the correlation of the first context to the second context and the location of the first user, adjust the orientation of the display to direct the display toward the location of the first user.

2. The first device of claim 1, wherein the content is first content, and wherein the instructions are executable to:
   access the at least one profile to identify a third context associated with a second user;
   correlate the third context to a fourth context associated with second content presented on the display;
   identify a location of the second user; and
   based on the correlation of the third context to the fourth context and based on the location of the second user, adjust the orientation of the display to direct the display toward the location of the second user based on the display currently presenting the second content.

3. The first device of claim 1, comprising a motor that is actuatable to adjust the orientation of the display.

4. The first device of claim 1, wherein the at least one profile comprises social media likes of other people's content.

5. The first device of claim 1, wherein the instructions are executable to:
   receive at least one wireless signal from a second device different from the first device; and
   based on the at least one wireless signal and communication with a third device different from the first and second devices, triangulate the location of the second device and use the location of the second device as the location of the first user.

6. The first device of claim 1, wherein the instructions are executable to:
   present a graphical user interface (GUI), the GUI comprising a selector that is selectable to command the first device to track the first user to direct the display toward the location of the first user.

7. The first device of claim 1, wherein the instructions are executable to:
   present a graphical user interface (GUI), the GUI comprising a selector that is selectable to command the first device to, rather than tracking one or more users to direct the display toward the locations of the one or more users, maintain the display in a stationary orientation.

8. The first device of claim 1, wherein the instructions are executable to:
   identify a second user, the second user being different from the first user;
   determine that the second user is not associated with the first context; and
   select the first user to direct the display toward the location of the first user based on the second user not being associated with the first context and based on the correlation of the first context to the second context.

9. A method, comprising:
   accessing digital profile data associated with a user to identify a context associated with the user as being associated with metadata of content presented on a display;
   identifying a location of the user;
   based on the context associated with the user being associated with the metadata and based on the location of the user, actuating a motor in a first device to adjust the orientation of the display to direct the display toward the location of the user.

10. The method of claim 9, wherein the user is a first user, and wherein the method comprises:
    identifying a second user, the second user being different from the first user;
    determining that the second user is not associated with the context; and
    selecting the first user to direct the display toward the location of the first user based on the second user not being associated with the context and based on the display currently presenting the content.

11. The method of claim 9, wherein the user is a first user, wherein the context is a first context, and wherein the method comprises:
    identifying a second user, the second user being different from the first user;
    identifying a second context associated with the second user; and
    selecting the first user to direct the display toward the location of the first user based on the display currently presenting content associated with the first context but not the second context.

12. The method of claim 9, wherein the user is a first user, and wherein the method comprises:
    presenting a graphical user interface (GUI), the GUI comprising a selector that is selectable to provide a command to track a second user to direct the display toward the location of the second user, the second user being different from the first user.

13. The method of claim 9, comprising:
    presenting a graphical user interface (GUI), the GUI comprising a selector that is selectable to provide a command to, rather than tracking the user to direct the display toward the location of the user, maintain the display in a stationary orientation.

14. The method of claim 9, wherein the digital profile data comprises social media likes of other people's content.

15. At least one computer readable storage medium (CRSM) that is not a transitory signal, the at least one CRSM comprising instructions executable by at least one processor to:
- identify a first context associated with a first user as being associated with metadata of content presented on a display;
- identify a current location of the first user;
- based on the first context associated with the first user being associated with the metadata and based on the current location of the first user, adjust the orientation of a display to direct the display toward the current location of the first user.

16. The at least one CRSM of claim 15, wherein the instructions are executable to:
- access digital profile data associated with the first user to identify the first context, wherein the digital profile data comprises social media likes of other people's content.

17. The at least one CRSM of claim 15, wherein the instructions are executable to:
- present a graphical user interface (GUI), the GUI comprising a selector that is selectable to command the at least one processor to track the first user to direct the display toward the location of the first user.

18. The at least one CRSM of claim 15, wherein the instructions are executable to:
- present a graphical user interface (GUI), the GUI comprising a selector that is selectable to command the at least one processor to, rather than tracking one or more users to direct the display toward the locations of the one or more users, maintain the display in a stationary orientation.

19. The at least one CRSM of claim 15, wherein the instructions are executable to:
- direct the display toward the current location of the first user while the first user is within a threshold distance to the display, the at least one processor not directing the display toward the current location of the first user based on identifying the first user but determining that the first user is outside the threshold distance.

20. The at least one CRSM of claim 15, wherein the content is first content, wherein the metadata is first metadata, and wherein the instructions are executable to:
- track respective current locations of the first user and a second user as both the first and second users move about an environment, the second user being different from the first user; and
- based on the second user being associated with a second context associated with second metadata of second content presented on the display and responsive to content presented on the display changing from the first content to the second content, adjust the orientation of the display to direct the display toward the current location of the second user.

* * * * *